United States Patent
Lindoff et al.

(10) Patent No.: US 8,923,199 B2
(45) Date of Patent: Dec. 30, 2014

(54) METHOD AND ARRANGEMENT FOR NETWORK NODES OF A WIRELESS COMMUNICATION NETWORK

(75) Inventors: Bengt Lindoff, Bjärred (SE); Ylva Jading, Stockholm (SE); Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 369 days.

(21) Appl. No.: 13/512,521

(22) PCT Filed: Nov. 30, 2010

(86) PCT No.: PCT/EP2010/068498
§ 371 (c)(1),
(2), (4) Date: Aug. 5, 2012

(87) PCT Pub. No.: WO2011/076529
PCT Pub. Date: Jun. 30, 2011

(65) Prior Publication Data
US 2012/0294239 A1 Nov. 22, 2012

(30) Foreign Application Priority Data
Dec. 22, 2009 (EP) .................................. 09180306

(51) Int. Cl.
*H04W 4/00* (2009.01)
*H04W 52/02* (2009.01)
*H04W 88/08* (2009.01)

(52) U.S. Cl.
CPC .......... *H04W 52/0232* (2013.01); *H04W 88/08* (2013.01)
USPC ...................................................... 370/328

(58) Field of Classification Search
CPC ... H04L 1/0002; H04L 1/0025; H04W 28/14; H04W 52/04; H04W 72/04; H04W 72/12; H04W 76/02
USPC ......... 370/311, 328, 352, 255, 256, 466, 230, 370/252
See application file for complete search history.

(56) References Cited

U.S. PATENT DOCUMENTS

2008/0025235 A1* 1/2008 Mahany et al. ............... 370/256
2008/0151797 A1 6/2008 Camp
(Continued)

FOREIGN PATENT DOCUMENTS

WO 02/07464 A1 1/2002
WO 2009/140988 A1 11/2009

OTHER PUBLICATIONS

PCT International Search Report, mailed Jan. 18, 2011, in connection with International Application No. PCT/EP2010/068498.
(Continued)

*Primary Examiner* — Raj Jain
(74) *Attorney, Agent, or Firm* — Leffler Intellectual Property Law, PLLC (57) ABSTRACT

A method of operating a wireless network node of a wireless communication network is disclosed. The wireless network nodes have at least first and second downlink transmission modes, the first downlink transmission mode comprising normal operation of a particular network node and being applicable when a number of active terminals in a cell associated with the particular network node is greater than a first mode threshold value, and the second downlink transmission mode comprising restricted downlink transmission of the particular network node and being applicable when the number of active terminals in the cell associated with the particular network node is less than or equal to a second mode threshold value. The method comprises transmitting a signal indicative of a current downlink transmission mode of the wireless network node. Corresponding computer program product and arrangement are also disclosed.

15 Claims, 2 Drawing Sheets

(56) References Cited

U.S. PATENT DOCUMENTS

| | | |
|---|---|---|
| 2009/0034454 A1* | 2/2009 | Kubler et al. .................. 370/328 |
| 2009/0170510 A1* | 7/2009 | Kim ............................... 455/434 |
| 2009/0279466 A1 | 11/2009 | Ji et al. |
| 2011/0026503 A1* | 2/2011 | Mueck et al. .................. 370/338 |
| 2012/0100845 A1* | 4/2012 | Mildh et al. ................... 455/418 |
| 2013/0153298 A1* | 6/2013 | Pietraski et al. ................. 175/45 |

OTHER PUBLICATIONS

PCT Written Opinion, mailed Jan. 18, 2011, in connection with International Application No. PCT/EP2010/068498.

3GPP TS 36.133, V.1.0 Technical Specification Group Radio Access Network; Evolved Universal Terrestrial Radio Access (E-UTRA); Requirements for support of radio resource management (Release 9), Sep. 2009.

3GPP TS 36.214, V9.0.0 Technical Specification Group Radio Access Network; Evolved Universal Terrestrial Radio Access (E-UTRA); Physical layer—Measurements (Release 9), Dec. 2009.

3GPP TS 36.331, V9.0.0 Technical Specification Group Radio Access Network; Evolved Universal Terrestrial Radio Access (E-UTRA) Radio Resource Control (RRC); Protocol specification (Release 9), Sep. 2009.

PCT International Preliminary Report on Patentability, mailed Jul. 5, 2012, in connection with International Application No. PCT/EP2010/068498.

* cited by examiner

METHOD AND ARRANGEMENT FOR NETWORK NODES OF A WIRELESS COMMUNICATION NETWORK

CROSS-REFERENCE TO RELATED APPLICATIONS

This application claims priority under 35 U.S.C. §119 to European Patent Application No. 09180306.4, filed Dec. 22, 2009, which is hereby incorporated herein by reference in its entirety.

TECHNICAL FIELD

The present invention relates generally to the field of operating network nodes in a wireless communication network where the network nodes have two operation modes, such as a high activity mode and a low activity mode.

BACKGROUND

Energy consumption has always been and still is an important issue for mobile terminals of wireless communication systems such as cellular systems. Recently, trends in environmental friendly technology make it important to reduce the energy consumption also for the network nodes (e.g. base stations—BS, NodeB, eNodeB, etc). Unlike terminals, which have possibilities to go into idle (or sleep) mode once they are not active, a network node needs to always transmit some signals (e.g. pilots, synchronization symbols and broadcast messages) so that camping terminals may stay in synchronization (in sync) with the network.

In an example scenario, when a network node serves a cell with many active terminals and some idle terminals, the network node may need to continuously transmit pilots, synchronization signals, etc, in order to maintain connection to the terminals. However, in an alternative scenario, when a network node serves a cell where all terminals are in an idle state (or in an active state with very low activity), the situation is somewhat different. In such scenarios, the terminals do not receive any data (or only a very small amount of data). The terminals only need to do mobility measurements (such as measurements for cell reselection or handover) and listen to paging messages. In such scenarios, a network node which is transmitting according to its conventional transmission scheme will waste a lot of energy.

Proposals considering an ability to put network nodes with a low load (e.g. serving no or few active terminals) into an "idle" state have been discussed.

An "idle" state (or energy saving mode) of a network node may be applicable when there are no active terminals in a cell associated with the network node. Alternatively or additionally, the "idle" state of a network node may be applicable when the number of active terminals in the cell are less than or equal to a threshold.

In the same manner a normal operation mode of a network node may be applicable when there is at least one active terminal in a cell associated with the network node. Alternatively or additionally, the normal operation mode may be applicable when the number of active terminals in the cell is greater than a threshold (which may or may not be the same as the threshold for the "idle" state).

Generally, the "idle" state may comprise restricted downlink transmissions. For example, some signals may be transmitted intermittently instead of continuously, and/or some signals may be transmitted using only part of the cell transmission bandwidth, and/or some signals may not be transmitted at all.

An example of a network node "idle" state may be a low activity mode of the network node comprising restricted or reduced downlink transmissions. One possible approach might be to reduce the amount of transmitted signals or channels to an absolute minimum. There are numerous possible ways to achieve a low activity mode of a network node, and the possibilities may vary depending on the access technology under consideration. Definitions and particulars of a network node "idle" state may be specified in standardization documentation for the applicable standards. Low activity state, low transmission state, restricted state, and restricted transmission state are other examples of possible terminologies that may be used for the idle state. The skilled person recognizes that all of these terms may have similar or the same meaning. Hereinafter, the terms idle state, energy saving mode and low activity mode will be used. A few examples of approaches that are applicable to UMTS LTE (Universal Mobile Telecommunication Standard Long Term Evolution, Release 9, 10 and onwards; E-UTRAN—Evolved UMTS Terrestrial Radio Access Network) are given in the following. It should be noted however, that these are merely examples and by no way limiting to the invention.

In UMTS LTE it may be sufficient for a NodeB in the "idle" state to transmit only synchronization signals (PSS—Primary Synchronization Sequence/SSS—Secondary Synchronization Sequence) and physical broadcast information (P-BCH—Physical Broadcast CHannel) together with pilot symbols (also denoted reference signals and used for e.g. channel estimation) in association with the P-BCH transmission. These signals are transmitted in well defined OFDM symbols in sub-frames 0 and 5 in both FDD (Frequency Division Duplex) and TDD (Time Division Duplex). If such an approach is used, the NodeB can reduce its duty cycle significantly and basically transmit information only in a few OFDM symbols of the sub-frames 0 and 5.

If more limited pilot (or reference) signals are transmitted in the energy saving mode (e.g. only in sub-frames 0 and 5, and only over 6 central resource blocks, then a terminal may perform measurements over a smaller bandwidth than when the network node is in non-energy saving mode.

In another approach that further reduces the amount of transmissions in UMTS LTE, only the synchronization signals (PSS/SSS) are transmitted by the network node when it is in the "idle" state. As in the previous example above these signals are transmitted in sub-frames 0 and 5. The transmission takes place over 6 central resource blocks regardless of the actual cell transmission bandwidth (i.e. the bandwidth in the active state).

A problem that arises when reducing the number of pilots is that the terminal needs to rely on fewer symbols for keeping in sync with the network node.

Another problem that arises is that the operations of a terminal (e.g. measurements, paging listening, etc) designed to work well when the corresponding network node is in a normal operation mode may not be optimal when the corresponding network node is in the "idle" state.

Thus, there is a need for methods and arrangements for enabling a terminal to operate adequately in a wireless communication network having network nodes with two operational modes, e.g. a high activity mode (conventional operation) and a low activity mode ("idle" state).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements for enabling a terminal to operate adequately in a wireless communication network having network nodes with two operational modes.

The two operational modes may be operable to set the entire network node operation into a high activity operational mode or a low activity operational mode. It should be noted, however, that the two operational modes may alternatively or additionally be applicable on cell level (in the case when a network node serves several cells) and/or on carrier level (in the case when a network node or cell applies more than one carriers). Thus, to give an example, the same network node may simultaneously serve one of its cells in a low activity mode and another one of its cells in high activity mode.

According to a first aspect of the invention, this is achieved by a method of operating a wireless network node of a wireless communication network. The wireless network node has at least first and second downlink transmission modes. The first downlink transmission mode comprises normal operation of the network node and is applicable when a number of active terminals in a cell associated with the network node is greater than a first mode threshold value. The second downlink transmission mode comprises restricted downlink transmission of the network node and is applicable when the number of active terminals in the cell associated with the network node is less than or equal to a second mode threshold value. The restricted downlink transmission comprises information that assists active terminals not served by the cell in finding the cell and/or non-active terminals camping on the cell to stay in synchronization with the wireless communication network. The method comprises transmitting a signal indicative of a current downlink transmission mode of the wireless network node.

In some embodiments, the signal indicative of the current downlink transmission mode may comprise an identification of the current downlink transmission mode. In some embodiments, the signal indicative of the current downlink transmission mode may comprise an indication of a change of the current downlink transmission mode.

In some embodiments, the method may comprise determining if the network node should change a current downlink transmission mode. If it is determined that the network node should change the current downlink transmission mode the method may further comprise transmitting a signal comprising an indication of the change of the current downlink transmission mode and changing the current downlink transmission mode.

The method may, in some embodiments, comprise determining if the network node should change the current downlink transmission mode to the second downlink transmission mode when the current downlink transmission mode is the first downlink transmission mode. If it is determined that the network node should change the current downlink transmission mode to the second downlink transmission mode the method may further comprise transmitting the signal comprising the indication of the change of the current downlink transmission mode and changing the current downlink transmission mode to the second downlink transmission mode.

In some embodiments, the step of determining if the network node should change the current downlink transmission mode to the second downlink transmission mode may comprise evaluating the number of active terminals served by the cell and determining that the network node should change the current downlink transmission mode to the second downlink transmission mode if the number of active terminals served by the cell is less than or equal to the second mode threshold value.

In some embodiments, the step of determining if the network node should change the current downlink transmission mode to the second downlink transmission mode may comprises evaluating the number of active terminals served by the cell and determining that the network node should change the current downlink transmission mode to the second downlink transmission mode if the number of active terminals served by the cell is less than or equal to a first mode transition threshold value, wherein the first mode transition threshold value is larger than the second mode threshold value. The method may also comprise forcing handover of a particular number of the active terminals served by the cell to other cells prior to the step of changing the current downlink transmission mode to the second downlink transmission mode, wherein the particular number is larger than or equals the number of active terminals minus the second mode threshold value.

The method may, in some embodiments, comprise determining if the network node should change the current downlink transmission mode to the first downlink transmission mode when the current downlink transmission mode is the second downlink transmission mode. If it is determined that the network node should change the current downlink transmission mode to the first downlink transmission mode the method may further comprise changing the current downlink transmission mode to the first downlink transmission mode and transmitting the signal comprising the indication of the change of the current downlink transmission mode.

In some embodiments, the step of determining if the network node should change the current downlink transmission mode to the first downlink transmission mode may comprise evaluating a number of terminals that will become active and that could be served by the cell and the number of active terminals served by the cell, and determining that the network node should change the current downlink transmission mode to the first downlink transmission mode if the number of terminals that will become active and that could be served by the cell plus the number of active terminals served by the cell is greater than a second mode transition threshold value.

The method may further comprise transmitting a signal indicative of a current downlink transmission mode of a neighbouring network node of the wireless network node according to some embodiments of the invention.

In such embodiments, the method may further comprise determining a change of the current downlink transmission mode of the neighbouring network node and the step of transmitting the signal indicative of the current downlink transmission mode of the neighbouring network node may comprise transmitting an indication of the change of the current downlink transmission mode of the neighbouring network node.

In some embodiments, the signal indicative of the current downlink transmission mode of a particular network node may further comprise additional information. The additional information may comprise at least one of:

information regarding when a change in the downlink transmission mode occurs, information regarding a duration of time in which the particular network node will maintain a new downlink transmission mode information regarding an identity (e.g. a physical cell identity or a cell global identity) of the particular network node, information regarding a carrier frequency of the particular network node, information regarding a radio access technology of the particular network node, information regarding transmission parameters of the second downlink transmission mode (e.g. transmission bandwidth of pilot signals), information regarding which signals (if any) are transmitted during the second downlink transmission mode, information regarding one or more component carriers of the particular network node in a multi-carrier or carrier aggregation system.

In some embodiments, the signal indicative of the current downlink transmission mode of the wireless network node may be transmitted using at least one of: a broadcast channel, a paging channel, a synchronization channel, a shared channel, a dedicated channel, a physical control channel, and a message dedicated for transmission of the signal.

In some embodiments, the second operation mode may comprise intermittent downlink transmission of the particular network node.

The first and/or second mode threshold value may equal zero according to some embodiments.

A second aspect of the invention is a computer program product comprising a computer readable medium, having thereon a computer program comprising program instructions, the computer program being loadable into a data-processing unit and adapted to cause the data-processing unit to execute method steps according to the first aspect of the invention when the computer program is run by the data-processing unit.

A third aspect of the invention is an arrangement for a wireless network node of a wireless communication network, wherein the wireless network node has at least first and second downlink transmission modes. The first downlink transmission mode comprises normal operation of the network node and is applicable when a number of active terminals in a cell associated with the network node is greater than a first mode threshold value. The second downlink transmission mode comprises restricted downlink transmission of the network node and is applicable when the number of active terminals in the cell associated with the network node is less than or equal to a second mode threshold value. The restricted downlink transmission comprises information that assists active terminals not served by the cell in finding the cell and/or non-active terminals camping on the cell to stay in synchronization with the wireless communication network. The arrangement comprises circuitry arranged to determine if the network node should change a current downlink transmission mode, a controller arranged to change the current downlink transmission mode if it is determined that the network node should change the current downlink transmission mode, and a transmitter arranged to transmit a signal comprising an indication of the change of the current downlink transmission mode.

A fourth aspect of the invention is a wireless network node comprising the arrangement according the third aspect of the invention.

In some embodiments, the second, third and fourth aspects of the invention may additionally have features identical with or corresponding to any of the various features as explained above for the first aspect of the invention.

An advantage of some embodiments of the invention is that the terminal is informed of the current operational mode of the network node. The terminal may adapt its operations accordingly. For example, the terminal may adapt one or more of its time/frequency synchronization, its channel estimation algorithms, and its measurement algorithms relating to cell reselection, handover and/or radio link monitoring based on the current operational mode of the network node.

Another advantage of some embodiments of the invention is that the terminal behavior (in terms of robustness, performance and/or power consumption) may be improved.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

In the following, embodiments of the invention will be described where a network node of a wireless network transmits an indication of its current operational mode to one or more terminals of the wireless network.

The description of embodiments of the invention will focus on UMTS LTE: However, it is to be understood that the invention is not limited to application is such systems. Furthermore, the term NodeB is used in the description, but this is in no way to be construed as limiting. Contrarily, embodiments of the invention are equally applicable in the context of any type of network node, such as any base station (eNodeB, femto cell, home base station, home eNodeB, home NodeB) or any radio network node having base station functionalities and capabilities.

First, a general description of example network signaling and some example tasks that may need to be performed by a terminal (or is desirable that a terminal performs) in a wireless communication network is given.

In order for a terminal to detect a cell and keep itself in synchronization with the network, a number of physical signals typically need to be transmitted by the network. In general, the terminal needs some type of synchronization signal(s) to synchronize itself with the system (e.g. P-SCH (Primary Synchronization CHannel) termed PSS (Primary Synchronization Sequence) and S-SCH (Secondary Synchronization CHannel) termed SSS (Secondary Synchronization Sequence) in UMTS and UMTS LTE).

Furthermore, some kind of reference symbols or pilot signals are typically required (e.g. CPICH (Common PIlot CHannel) in UMTS and RS (Reference Symbols) in UMTS LTE). These signals may be used to measure the signal strength and/or signal quality of a cell. They may also be used to estimate the radio channel used for data demodulation. In UMTS LTE FDD, RS typically used for measurements are transmitted in sub-frames 0, 4, 5, 9, from antenna port 0, and in the central 6 resource blocks.

The cell might also need to transmit broadcast information in order for a terminal to know various parameters (e.g.

needed for setting up a connection). Depending on the cellular system, such information is transmitted on different physical channels. In UMTS LTE, broadcast information is sent via the physical broadcast channel (PBCH) and the physical downlink shared channel (PDSCH). The PBCH is transmitted in sub-frame 0 and contains the master information block (MIB), which carries important information such as cell bandwidth, one or more antenna ports, system frame number (SFN), etc. Other, more detailed, information may be transmitted via one or more of several system information blocks (SIB), which are mapped on PDSCH and transmitted in sub-frame 5 in UMTS LTE. In UMTS, there is only one broadcast channel, which contains both MIB and SIBs.

Thus, in UMTS LTE, the PSS/SSS and the broadcast channel (BCH) are used for the above purposes. It is noted, however, that some carriers may carry PSS/SSS but no BCH. It is also noted that other systems may employ other setups.

Information like the one described above (synchronization signals, reference signal, broadcast information) are commonly denoted Necessary Cell Identity Information (NCII), and is an example of information that may be transmitted by a network node in energy saving mode.

One example task to be performed by a terminal is performing mobility measurements. Depending on the current mode of the terminal, the terminal may perform any of two types of mobility, namely idle mode mobility (e.g. for cell reselection purposes) or connected mode mobility (e.g. for handover purposes).

In most applications, the cell reselection is a mainly terminal autonomous function without any direct intervention of the network. However, the terminal behaviour in this mobility scenario could—to some extent—be controlled by broadcasted system parameters and by performance specification. The handover, on the other hand, is in general fully controlled by the network through explicit terminal specific commands and by performance specification.

For both idle mode and connected mode, mobility decisions may mainly be based on downlink neighbor cell measurements (which may be of the same or different type for the two terminal operational modes).

For example, in UMTS LTE (E-UTRAN—Evolves UMTS Terrestrial Radio Access Network) the following downlink neighbor cell measurements (measured for serving and neighboring cells) are specified primarily for mobility purpose (see the specification document 3GPP TS 36.214, "Evolved Universal Terrestrial Radio Access (E UTRA); Physical layer measurements"):

Reference symbol received power (RSRP), which is signal strength measurement, and
  Reference symbol received quality (RSRQ), which is signal quality measurement (RSRQ=RSRP/carrier RSSI (Received Signal Strength Indication)).

Another example task for the terminal concerns radio link monitoring. In general, the radio link monitoring (RLM) procedure enables the terminal to detect whether it is out of sync or in sync with the serving cell.

The procedure may be used when the terminal is in RRC (Radio Resource Control) connected mode. In UMTS LTE, the RLM procedure and the corresponding requirements are specified in the specification documents 3GPP TS 36.331, "Evolved Universal Terrestrial Radio Access (E UTRA); Radio Resource Control (RRC); Protocol specification" and 3GPP TS 36.133, "Evolved Universal Terrestrial Radio Access (E UTRA); Requirements for support of radio resource management".

In some applications of UMTS LTE, the terminal measures the serving cell downlink quality based on a common reference signal to determine whether it is out of sync or in sync with the serving cell. After N successive out of sync determinations have been registered (where N is a network configured parameter), a radio link failure (RLF) procedure may be initiated. Upon completion of the RLF procedure, the terminal typically turns off its transmitter and may attempt to establish (or re-establish) a connection to the most suitable cell (e.g. the cell with the strongest measured signal).

When a terminal is located in a wireless communication system where at least one network node may be in one of two operational modes as described above, it may be an advantage for the terminal to know the current operational mode of the network node (for example to be able to perform any of the above example tasks as accurately and resource efficiently as possible).

Thus, there is a need for methods and arrangements for enabling a terminal to operate adequately in a wireless communication network having network nodes with two operational modes. To be able to achieve this, it is beneficial for the terminal to have knowledge of the current operational mode of network nodes in the network.

One way of achieving this is to transmit information from the network to the terminal indicating a current operational mode of one or more network nodes.

The gained knowledge regarding the current operational mode of the network node may be used to adapt further operations of the terminal. For example, if the current operational mode of the network node is an energy saving mode ("idle" state) the terminal may use synchronization signals (e.g. PSS/SSS) for one or more of: RLM, mobility measurements (e.g. signal strength/quality measurements for handover and/or cell re-selection), positioning related measurements (e.g. time difference of arrival of signals from different cells), time tracking, frequency tracking (e.g. automatic frequency control (AFC)), mobile speed detection, and Doppler estimation. On the other hand, if the current operational mode of the network node is a normal operation mode ("active" state) the terminal may use reference symbols (e.g. pilot symbols) for one or more of these purposes. In some embodiments, the gained knowledge may be used to adapt a time pattern based on the current downlink transmission mode, wherein the time pattern specifies when a receiver of the terminal is turned on (e.g. in discontinuous reception, DTX, mode of the terminal).

The transmitted information may comprise either or both of a direct indication of the current operational mode and an indication of a change of operational mode. Either of these types information may be conveyed using a single information bit.

The information may be transmitted to terminals connected to or camping on a cell associated with the network node under consideration. In some embodiments, information regarding the mode or change of mode of neighboring cells may also be transmitted. The terminal may adapt its operation based on the mode of a network node (serving/camping or neighboring). This adaptation may improve the terminal behavior (e.g. in terms of robustness, performance and/or power consumption) as exemplified above.

Transmission of the information may, for example, be accomplished via broadcasting the information (e.g. on BCH), sending it via a synchronization channel (e.g. PSS/SSS in UMTS LTE), including it in paging messages to the terminals, sending a message dedicated for this purpose, including the information in transmissions on a dedicated or terminal specific channel (e.g. PDCCH or PDSCH in UMTS LTE), including the information in transmissions on a SIB, or using any other means of conveying the information.

According to some embodiments, additional information may also be included in such transmissions. For example, information regarding a time instant when a mode change will occur, a duration of the mode (e.g. during which time the network node will stay in an energy saving mode), and/or the setup of the restricted transmission in an energy saving mode (e.g. transmission parameters and/or which signals will be transmitted and when) may be included.

An example of a transmission parameter that may be included in the additional information is the bandwidth used to transmit a restricted or reduced number of pilot signals or reference signals (RS). In LTE, for example, the reference signals are in general transmitted over the entire bandwidth. However, in low activity mode the reference signals could be transmitted over fewer resource blocks (e.g. over the 6 central resource blocks). Hence, in this example, the base station may signal to the terminal (e.g. before its transfer to low activity mode) that the reference signal transmission bandwidth in low activity mode will be 6 resource blocks.

Other examples of additional information include information regarding an identity, radio access technology, and/or carrier frequency of the network node associated with the signaled mode (particularly relevant when the mode of neighboring nodes is signaled as will be explained in the following).

Another specific example of additional information that may be required or desirable relates to a multi-carrier system, where the same terminal is served over more than one carrier frequency in the downlink and/or in the uplink to enhance the data rate. A multi-carrier system (also referred to as carrier aggregation) is part of the evolution of UMTS LTE and UMTS (WCDMA and UTRAN TDD). For instance, in an UMTS LTE multi-carrier system, the network may serve (i.e. transmit data) over multiple 20 MHz carriers (e.g. 4 component carriers each of 20 MHz). For the purpose of energy saving one or more component carriers may be partially or fully turned off in a low activity operational mode. Hence, in such an example, the additional information may include information regarding which one or more of the component carriers in the serving (and/or neighbor) cells will be used also in a low activity operational mode and/or which of the component carriers are used in a high activity operational mode.

In general, a synchronization channel is always present in most systems, so this is a convenient and robust channel for conveying network mode information. In order to reduce overhead it is preferred in some embodiments to not reserve more than one or two bits on the synchronization channel for carrying of the mode information. In such embodiments, it is therefore not feasible to provide more detailed additional information.

According to some embodiments, there may be several definitions of the "idle" state of a network node specified. For example, there may be several ways of organizing transmitted signals/channels to save energy. In such embodiments, a terminal may be informed of the current "idle" state type using methods similar to those described above.

Figure 1:
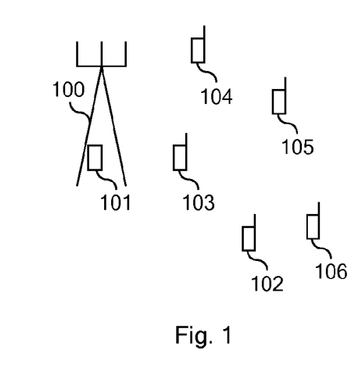
FIG. 1 is a schematic drawing illustrating a plurality of mobile terminals and a base station site which may comprise an arrangement according to some embodiments of the invention.

FIG. 1 illustrates a plurality of mobile terminals 102, 103, 104, 105, 106. The mobile terminals are adapted to connect to a mobile telecommunication network via a wireless link to a radio base station 101 of a base station site 100. The base station 101 may, for example, comprise an arrangement as will be described in connection to FIG. 5 and/or perform any of the methods as described in connection to FIGS. 2 and 3.

Figure 2:
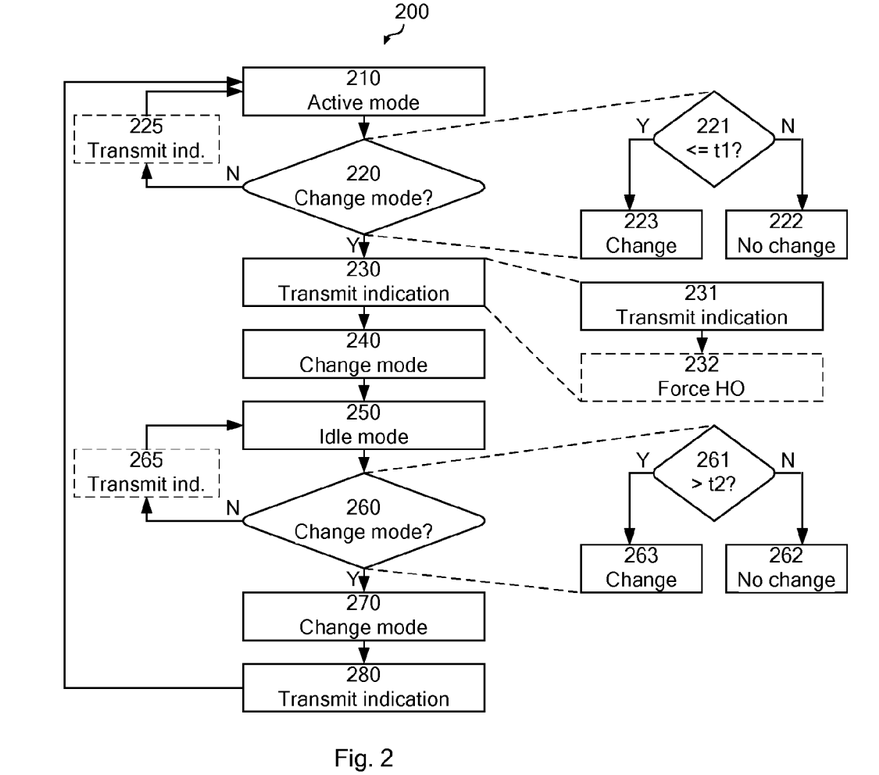
FIG. 2 is a flowchart illustrating example method steps according to some embodiments of the invention.

FIG. 2 illustrates an example method 200 that may be performed by a network node (e.g. a base station) according to some embodiments of the invention.

When the network node is in a normal operation mode (step 210), it may evaluate whether or not it should change operational mode to an energy saving mode. Such an evaluation may be performed on regular basis (e.g. at regular time intervals and/or at specific times, on specific days, etc.) or based on some related conditions (e.g. each time a connection to a terminal is terminated).

If it is determined that the network node should not change operational mode (NO-path out of step 220) the network node stays in the current mode (step 210). An indication to this end may be transmitted to terminals associated with the network node (optional step 225).

If it is determined that the network node should change operational mode (YES-path out of step 220) the process proceeds to step 230, where an indication regarding the change is transmitted to terminals associated with the network node. Additional information may also be included in the transmission. The time instant of the change may be signaled or may be pre-defined (e.g. in a standardization document and for example as a particular number of subframes or frames after sending the mode change indication). Information regarding the time duration of the energy saving mode may also be signaled if it is known to the system. In some embodiments, a default duration of the energy saving mode may be pre-defined (e.g. in a standardization document). Furthermore, the NCII may also be transmitted from in step 230 according to some embodiments of the invention. Then the network node changes mode to an energy saving mode in step 240.

The determination in step 220 of whether or not to change mode may be performed by comparing the number of active/connected terminals associated by the network node (e.g. served by a cell of the network node and/or requesting handover to the network node and/or indicated by a neighboring node as being servable by the network node under consideration) to a threshold (t1) as illustrated in sub-step 221. Terminals that are about to become active (e.g. terminals requesting access) may also be included in the evaluation. The number of terminals to evaluate may be tracked by a load indicator. The threshold may, for example, be set to zero or any adequate positive value. If the number of terminals is larger than the threshold (NO-path out of sub-step 221) it may be determined that there should not be any change of mode (sub-step 222). If the number active of terminals less than or equal to the threshold (YES-path out of sub-step 221) it may be determined that there should be a change of mode (sub-step 223).

The transmission of the indication of the mode change of step 230 may be combined with a forced handover of some or all of the active terminals to neighboring network nodes before the actual mode change takes place. This is illustrated by sub-step 231 and optional sub-step 232. The need for performing sub-step 232 may depend on the value of the threshold (t1), the number of terminals that it is possible to serve for a network node in energy saving mode and/or the number of terminals in the evaluation of step 220. For example, if there where no active terminals in the evaluation of step 220, there is no need to perform sub-step 232. Similarly, if the threshold (t1) is set to zero, there is never any need to perform sub-step 232. Yet similarly, if the number of active terminals in the evaluation of step 220 may all be served by the network node in its energy saving mode, there is no need to perform sub-step 232. More generally, at it is preferable to force handover of at least a number of terminals that equals the number of active terminals minus the number of terminals that can be served in an energy saving mode.

When the network node is in an energy saving operation mode (step 250), it may evaluate whether or not it should change operational mode to a normal operation mode. Such an evaluation may be performed on regular basis (e.g. at regular time intervals and/or at specific times, on specific days, etc.) or based on some related conditions (e.g. each time a connection is requested by a terminal).

If it is determined that the network node should not change operational mode (NO-path out of step 260) the network node stays in the current mode (step 250). An indication to this end may be transmitted to terminals associated with the network node (optional step 265).

If it is determined that the network node should change operational mode (YES-path out of step 260) the process proceeds to step 270, where the network node changes mode to a normal operation mode. Then, an indication regarding the change is transmitted to terminals associated with the network node in step 280. Additional information may also be included in the transmission. The time instant of the change may be signaled or may be pre-defined similarly to what was described in relation to step 230. Information regarding the time duration of the normal operation mode may also be signaled if it is known to the system. In some embodiments, a default duration of the normal operation mode may be pre-defined (e.g. in a standardization document).

The determination in step 260 of whether or not to change mode may be performed by comparing the number of active/connected terminals associated by the network node (e.g. served by a cell of the network node and/or requesting handover to the network node and/or indicated by a neighboring node as being servable by the network node under consideration) to a threshold ($t2$) as illustrated in sub-step 261. The threshold $t2$ may or may not have the same value as the threshold $t1$ of sub-step 221. Terminals that are about to become active (e.g. terminals requesting access) may also be included in the evaluation. The threshold may, for example, be set to zero or any adequate positive value. If the number of terminals is larger than the threshold (YES-path out of sub-step 261) it may be determined that there should be a change of mode (sub-step 263). If the number active of terminals less than or equal to the threshold (NO-path out of sub-step 261) it may be determined that there should not be any change of mode (sub-step 262).

It is to be noted that the entire method 200 may be performed by a single network node (e.g. a base station) or by a combination of network nodes (e.g. steps 220 and 260 may be performed by a base station controller or other network controller, while the other steps may be performed by a base station).

It is to be noted that the thresholds $t1$ and $t2$ may relate to the thresholds where the different modes are applicable (see Background section). For example, if the normal operation mode is applicable for situations when there are more than $t3$ active terminals in a cell and the energy saving mode is applicable for situations when there are less than or equal to $t4$ active terminals in a cell, then the different thresholds may, in some embodiments, be related according to any of the following examples:

- $t1 <= t4$ (if no handover is applicable, step 232),
- $t1 > t4$ (if handover is applicable, step 232),
- $t3 = t4$
- $t3 < t4$
- $t2 > t3$ (particularly helpful if $t3$ is equal to or close to $t4$ and frequent mode changes should be avoided)
- $t2 = t3$.

Figure 3:
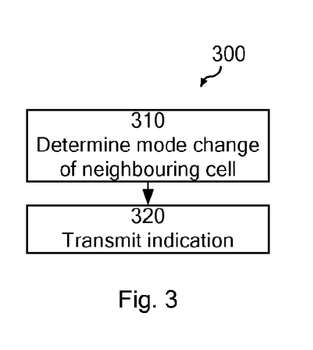
FIG. 3 is a flowchart illustrating example method steps according to some embodiments of the invention.

FIG. 3 illustrates an example method 300 that may be performed by a network node (e.g. a base station) according to some embodiments of the invention. In step 310, a network node acquires information regarding the current status of a neighboring cell (or network node). The information may concern an actual current mode of the neighboring node and/or a change of mode. This information may be acquired via reception of indications form the neighboring node or via measurements performed by the network node under consideration. In step 320, an indication regarding the mode of the neighboring node is transmitted to terminals associated with the network node under consideration.

The transmission of information of step 320 may be very similar to the transmission of information in steps 225, 230, 231, 265 and/or 280 of FIG. 2 and is hence not described in great detail. A difference, though, is that information regarding the cell identity (e.g. PCI—physical cell identity—in UMTS and UMTS LTE) of the neighboring node is typically transmitted along with the indication in step 320. Other type of information transmitted along with the indication in step 320 may comprise information regarding a restricted transmission bandwidth in the situation where only a part of the generally used bandwidth is to be used during the energy saving mode. Another similar parameter that may be transmitted along with the indication in step 320 is information regarding a restricted transmission bandwidth of reference signals.

Signaling of other parameters, such as carrier frequency and/or radio access technology (RAT) of the neighboring node, may also be useful.

For example if the serving cell operates according to UMTS LTE and a neighboring cell that operates according to UMTS (WCDMA or UTRAN TDD) will go into an energy saving mode or revert to the normal operation from an energy saving mode, information regarding the radio access technology of the neighboring node may be provided to the terminal by the serving UMTS LTE cell. Such information may comprise, but is by no means limited to, the target RAT identity, the carrier frequency of the cell(s), cell identity (at least the PCI). The information may also comprise other parameters as mentioned above, such as timing information (e.g. starting time and duration of the energy saving mode, or time for revert to normal operational mode).

Another example includes a UMTS LTE FDD serving cell and one or more target UMTS LTE TDD cells. In such an example, if one or more of the UMTS LTE TDD cells prepare to transfer to energy saving mode, the serving UMTS LTE FDD cell may signal information related to those UMTS LTE TDD cells preparing for energy saving mode. If one or more of the UMTS LTE TDD cells prepare to transfer to normal operation mode, the serving UMTS LTE FDD cell may signal information related to those UMTS LTE TDD cells.

Obviously, the methods 200 and 300 of FIGS. 2 and 3 respectively may be combined, and the method 300 may be performed in parallel with the method 200 regardless if the network node under consideration is in its normal operation mode or in an energy saving mode.

Figure 4:
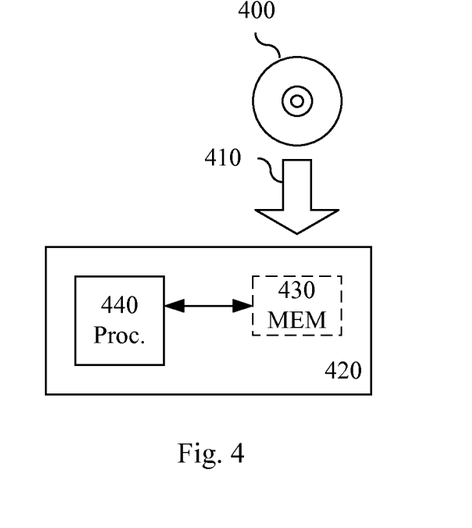
FIG. 4 is a schematic diagram illustrating a computer program product according to some embodiments of the invention.

FIG. 4 is a schematic drawing illustrating a computer readable medium in the form of a CD-ROM 400 according to some embodiments of the invention. The CD-ROM 400 may have stored thereon a computer program comprising program instructions. The computer program may be loadable (as shown by arrow 410) into an electronic device 420 comprising a processing unit 440 and possibly a separate memory unit 430. When loaded into the electronic device 420, the computer program may be stored in the memory unit 430. According to some embodiments, the computer program may, when loaded into the electronic device 420 and run by the processing unit 440, cause the electronic device 420 to execute method steps according to, for example, any of the methods shown in any of the FIGS. 2 and 3. The electronic device 420 may, for example be a communication device or a component of a communication device, wherein the communication device is a network node, a base station, a NodeB, a eNodeB, an access point, a home base station, a home NodeB, a home eNodeB, a radio network controller, or a base station controller.

Figure 5:
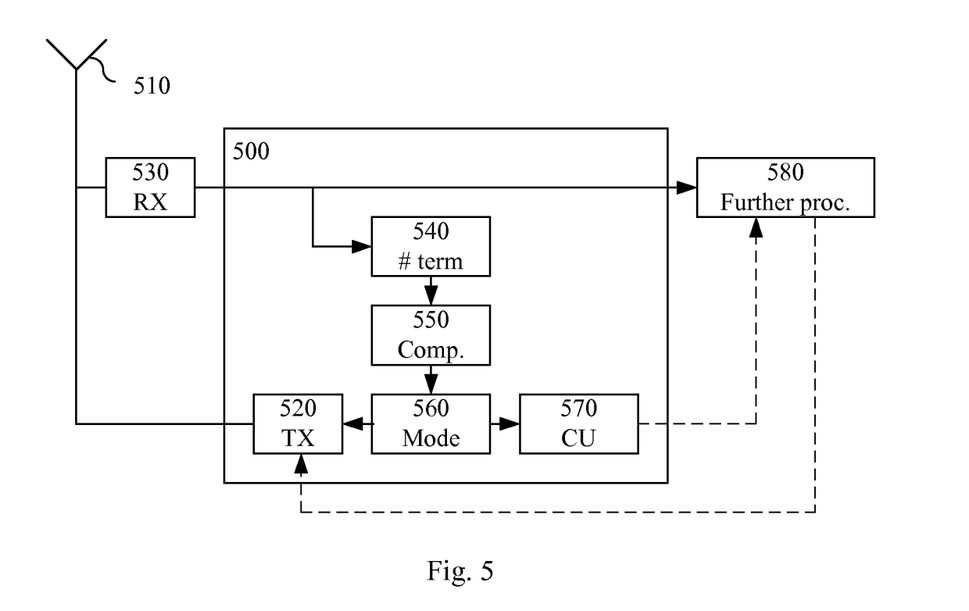
FIG. 5 is a block diagram illustrating an example arrangement according to some embodiments of the invention.

FIG. 5 illustrates an example arrangement 500 according to some embodiments of the invention.

The arrangement 500 comprises a load indicator 540 adapted to keep track of a number of terminals that should be used in a determination of whether to change mode or not. The load indicator 540 is arranged to receive signals from a receiver 530, which in turn is connected to one or more antennas 510.

The arrangement 500 also comprises a comparator 550 adapted to compare the number of terminals (furnished by the load indicator 540 to the comparator 550) to one or more thresholds (compare with steps 221 and 261 of FIG. 2).

The comparator 550 is adapted to supply the results of the comparisons to a mode determiner 560 of the arrangement 500, which is adapted to determine whether or not the network node associated with the arrangement should change mode (compare with steps 220 and 260 of FIG. 2).

The mode determiner 560 is adapted to inform a transmitter 520 (which is connected to the one or more antennas 510) and a controller 570 of a determination that a mode change is to be conducted.

The transmitter 520 is adapted to transmit an indication of the mode change (compare with steps 230, 231 and 280 of FIG. 2) and the controller 570 is arranged to change the operations of the network node (e.g. of blocks 580 and 520) in accordance with the new operation mode.

In some embodiments, functional blocks that already exist in the further processing block 580 may be re-used in the arrangement 500. This may, for example, apply to the controller 570 and/or the load indicator 540.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a network node, a base station or a base station controller.

According to some embodiments of the invention, a computer program product comprises a computer readable medium such as, for example, a diskette, a USB-stick or a CD-ROM (compare with FIG. 4). The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 2 and 3.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of operating a wireless network node of a wireless communication network,
the method comprising:
operating the wireless network node in a current downlink transmission mode that is one of at least first and second downlink transmission modes of the wireless network node; and
transmitting a signal indicative of a current downlink transmission mode of the wireless network node,
wherein:
the first downlink transmission mode comprises normal operation of the network node and is applicable when a number of active terminals in a cell associated with the network node is greater than a first mode threshold value; and
the second downlink transmission mode comprises restricted downlink transmission of the network node and is applicable when the number of active terminals in the cell associated with the network node is less than or equal to a second mode threshold value, the restricted downlink transmission comprising information that assists active terminals not served by the cell in finding the cell and/or non-active terminals camping on the cell to stay in synchronization with the wireless communication network.

2. The method of claim 1, wherein the signal indicative of the current downlink transmission mode comprises an identification of the current downlink transmission mode.

3. The method of claim 1, wherein the signal indicative of the current downlink transmission mode comprises an indication of a change of the current downlink transmission mode.

4. The method of claim 3, comprising, when the current downlink transmission mode is the first downlink transmission mode:

determining if the network node should change the current downlink transmission mode to the second downlink transmission mode; and if it is determined that the network node should change the current downlink transmission mode to the second downlink transmission mode:

transmitting the signal comprising the indication of the change of the current downlink transmission mode; and changing the current downlink transmission mode to the second downlink transmission mode.

5. The method of claim 4, wherein the step of determining if the network node should change the current downlink transmission mode to the second downlink transmission mode comprises:

evaluating the number of active terminals served by the cell; and determining that the network node should change the current downlink transmission mode to the second downlink transmission mode if the number of active terminals served by the cell is less than or equal to the second mode threshold value.

6. The method of claim 4, wherein the step of determining if the network node should change the current downlink transmission mode to the second downlink transmission mode comprises:

evaluating the number of active terminals served by the cell;

determining that the network node should change the current downlink transmission mode to the second downlink transmission mode if the number of active terminals served by the cell is less than or equal to a first mode transition threshold value, wherein the first mode transition threshold value is larger than the second mode threshold value; and forcing handover of a particular number of the active terminals served by the cell to other cells prior to the step of changing the current downlink transmission mode to the second downlink transmission mode, wherein the particular number is larger than or equals the number of active terminals minus the second mode threshold value.

7. The method of claim 3 comprising, when the current downlink transmission mode is the second downlink transmission mode:

determining if the network node should change the current downlink transmission mode to the first downlink transmission mode; and if it is determined that the network node should change the current downlink transmission mode to the first downlink transmission mode:

changing the current downlink transmission mode to the first downlink transmission mode; and transmitting the signal comprising the indication of the change of the current downlink transmission mode.

8. The method of claim 7, wherein the step of determining if the network node should change the current downlink transmission mode to the first downlink transmission mode comprises:

evaluating a number of terminals that will become active and that could be served by the cell and the number of active terminals served by the cell; and determining that the network node should change the current downlink transmission mode to the first downlink transmission mode if the number of terminals that will become active and that could be served by the cell plus the number of active terminals served by the cell is greater than a second mode transition threshold value.

9. The method of claim 1, further comprising:

transmitting a signal indicative of a current downlink transmission mode of a neighbouring network node of the wireless network node.

10. The method of claim 9, further comprising:

determining a change of the current downlink transmission mode of the neighbouring network node; and wherein the step of transmitting the signal indicative of the current downlink transmission mode of the neighbouring network node comprises transmitting an indication of the change of the current downlink transmission mode of the neighbouring network node.

11. The method of claim 1, wherein the signal indicative of the current downlink transmission mode of the wireless network node is transmitted using at least one of:

a broadcast channel;
a paging channel;
a synchronization channel;
a shared channel;
a dedicated channel;
a physical control channel; and
a message dedicated for transmission of the signal.

12. The method of claim 1, wherein at least one of the first and second mode threshold values equals zero.

13. A non-transitory computer readable medium, having thereon a computer program comprising program instructions, the computer program being adapted to cause a data-processing unit of a wireless network node of a wireless communication network to execute at least the following steps when the computer program is run by the data-processing unit:

operating the wireless network node in a current downlink transmission mode that is one of at least first and second downlink transmission modes of the wireless network node;

determining if the wireless network node should change the current downlink transmission mode; and if it is determined that the network node should change the current downlink transmission mode:

transmitting a signal comprising an indication of the change of the current downlink transmission mode; and changing the current downlink transmission mode, wherein:

the first downlink transmission mode comprises normal operation of the network node and is applicable when a number of active terminals in a cell associated with the network node is greater than a first mode threshold value; and the second downlink transmission mode comprises restricted downlink transmission of the network node and is applicable when the number of active terminals in the cell associated with the network node is less than or equal to a second mode threshold value, the restricted downlink transmission comprising information that assists active terminals not served by the cell in finding the cell and/or non-active terminals camping on the cell to stay in synchronization with the wireless communication network.

14. An apparatus for a wireless network node of a wireless communication network, the apparatus comprising:

circuitry arranged to operate the wireless network node in a current downlink transmission mode that is one of at least first and second downlink transmission modes of the wireless network node;

circuitry arranged to determine if the network node should change the current downlink transmission mode;

a controller arranged to change the current downlink transmission mode if it is determined that the network node should change the current downlink transmission mode; and a transmitter arranged to transmit a signal comprising an indication of the change of the current downlink transmission mode, wherein:

the first downlink transmission mode comprises normal operation of the network node and is applicable when a number of active terminals in a cell associated with the network node is greater than a first mode threshold value; and the second downlink transmission mode comprises restricted downlink transmission of the network node and is applicable when the number of active terminals in the cell associated with the network node is less than or equal to a second mode threshold value, the restricted downlink transmission comprising information that assists active terminals not served by the cell in finding the cell and/or non-active terminals camping on the cell to stay in synchronization with the wireless communication network.

15. A wireless network node comprising the apparatus according to claim 14.

* * * * *